3,388,132
PRODUCTION OF IMIDAZOLES
Hugo Kroeper and Jakob Sand, Ludwigshafen (Rhine), Germany, assignors to Badische Anilin- & Soda-Fabrik Aktiengesellschaft, Ludwigshafen (Rhine), Germany
No Drawing. Filed Mar. 15, 1965, Ser. No. 439,977
Claims priority, application Germany, Mar. 18, 1964, B 75,951
3 Claims. (Cl. 260—309)

ABSTRACT OF THE DISCLOSURE

Production of imidazole which may be substituted in the 4- and 5-positions by alkyl groups by reacting appropriate N-monoformylalkylene diamines or N,N'-diformylalkylene diamines in the gas phase in the presence of zinc oxide. The products are useful for the manufacture of textile auxiliaries, pharmaceuticals and dyes.

---

This invention relates to a process for the production of imidazoles in which N-monoformylalkylene diamines or N,N'-diformylalkylene diamines are reacted in the gas phase.

Prior art methods for the production of imidazoles are in some cases unproductive and in other cases protracted and complicated chemical processes. Thus imidazole may be prepared for example by reacting glyoxal with formaldehyde and ammonia in an aqueous medium. The method is extremely dependent on the concentration within which it must be carried out. In working up the reaction mixture, large amounts of water have to be removed because imidazole has unlimited miscibility with water and this is undesirable when working on an industrial scale. In another method, ethylene diamine is reacted with formaldehyde while cooling. The reaction mixture is passed in the gas phase over a dehydration catalyst and then together with hydrogen over a catalyst containing a noble metal. Only a small amount of imidazole is obtained in the subsequent fractional distillation of the liquid reaction product because the conversion, with reference to ethylene diamine, is only slight.

According to another method, imidazole is obtained by passing a mixture of ethylene diamine and formic acid over a catalyst containing a metal of the platinum group in the presence of molecular hydrogen in the gas phase at temperatures of from about 300° to 550° C. and then subjecting the condensate collected to fractional distillation. Conversion in this method is also low.

It is an object of this invention to provide a method for the production of imidazoles according to which the imidazoles may be prepared in a very simple way with good conversion and good yields in the gas phase. It is a further object of this invention to provide a process for the production of imidazoles in which readily accessible starting materials are used. Another object of the invention is to provide a simple method for separating the imidazoles from the reaction mixture.

These objects are achieved by heating N-monoformylalkylene diamines and/or N,N'-diformylalkylene diamines having the general formula:

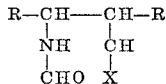

in which R denotes a hydrogen atom or an alkyl group and X denotes a hydrogen atom or the formyl group, in gas phase in the presence of zinc oxide at temperatures of from 250° to 800° C. It is preferred to use temperatures of from 300° to 600° C.

The method may be carried out with N-monoformylalkylene diamines or N,N'-diformylalkylene diamines whose amino groups are in α,β-position to each other. It is preferred to use formylated aliphatic diamines having two to ten carbon atoms in the molecule. The radicals R in the preferred initial materials therefore denote hydrogen atoms or alkyl groups having in each case one to four carbon atoms. Examples of suitable initial materials are the N-monoforylated or N,N'-diformylated derivatives of 1,2-diaminopropane, 1,2-diaminobutane, 2,3-diaminobutane, 2,3-diamino-4-methylpentane, 4,5-diamino-2-methylnonane, 1,2-diaminohexane and particularly of 1,2-diaminoethane.

The structural formula:

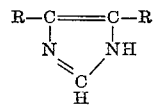

in which R has the above meaning may be attributed to the imidazoles which can be prepared according to this invention.

The monoformylated and/or diformylated diamines required for the reaction may be prepared in the reaction zone, for example by feeding thereto mixtures of the appropriate diamines with formic acid, formamide or methyl formate in the molar ratio 1:0.1 to 1:10, preferably 1:2 to 1:4, or by separate introduction of the diamines and formic acid, formamide or methyl formate or by passing carbon monoxide, preferably under increased pressure, for example 5 to 15 atmospheres, and the appropriate diamine into the reaction zone.

Pure zinc oxide may be used as the catalyst. The catalyst may be modified by addition of aluminum oxide in amounts of up to 90%, preferably 5 to 50% by weight, up to 10%, preferably 2 to 8%, by weight of calcium oxide, up to 10%, preferably 2 to 8%, by weight of potassium sulfate, up to 4% by weight of magnesium oxide and/or up to 8% by weight of phosphoric acid, calculated as phosphorus pentoxide. It may also contain up to a total of 3% by weight of chromium oxide, iron oxide, cobalt oxide, nickel oxide, copper oxide, potassium oxide and/or sodium oxide. The said additives may be present singly or as mixtures. It is however recommended that the catalyst should contain at least 10% by weight of zinc oxide. The catalyst may be applied to aluminum oxide as carrier. It is preferred to use catalysts containing at least 34% by weight of zinc oxide with 5 to 50% by weight of aluminum oxide, 2 to 8% by weight of calcium oxide and 2 to 8% by weight of potassium sulfate.

The catalyst components may be mixed, moistened with water and kneaded to produce the catalysts. The catalyst is then shaped in an extrusion press and calcined at 300° to 900° C. If the catalyst is to be used in the fluidized condition, granules having a diameter of 0.2 to 0.4 mm. may either be shaped from the start or the strands may be subsequently ground.

The process according to this invention may be carried out for example by passing the gaseous initial material into a reactor in which the catalyst is stationary or in fluidized motion. It is also possible, particularly with stationary catalysts, to introduce the initial material in small portions in liquid phase into the reactor which is heated to the reaction temperature. The reaction may be carried out at atmospheric pressure or superatmospheric pressure, for example up to 50 atmospheres. If the monoformylalkylene and/or diformylalkylene diamine to be used as initial material is to be prepared in the reaction chamber from the diamine and carbon monoxide, it is advantageous to use superatmospheric pressure, for example 5 to 15 atmospheres. Introduction of the initial materials may also be effected by means of an inert gas, for example nitrogen. The inert gas then acts as an entrainer and at the same time as a diluent. The inert gas is used in such an amount that the concentration of the initial materials in the inert gas is 0.1 to 50% by volume. The gaseous reaction mixture leaving the reactor is advantageously cooled to room temperature. The bulk of the imidazole is thus crystallized out and may be separated. The off-gas freed from the bulk of the imidazole prepared may be washed with water, the remaining fraction of the imidazole thus dissolving in the water. The remainder of the imidazole may then be recovered from the wash water by a conventional method, for example by concentration. The products, which are already very pure, may be further purified, for example by recrystallization from benzene.

Imidazole is an intermediate of great value, for example for the production of textile assistants and pharmaceuticals. Azo dyes are obtained by coupling with a diazonium salt.

The following examples will further illustrate the invention. The parts specified in the examples are parts by weight, unless stated otherwise. Parts by weight bear the same relation to parts by volume as the kilogram to the liter.

Example 1

67 parts of a 90% by weight aqueous solution of ethylene diamine and 90 parts of formamide are poured together and, after standing for two days at room temperature, metered into a quartz tube heated to 500° C. which contains 300 parts by volume of a stationary catalyst having the following composition: 78% by weight of zinc oxide, 7% by weight of aluminum oxide, 5% by weight of calcium oxide, 5% by weight of potassium sulfate, 2% by weight of magnesium oxide, 1% by weight of chromium (III) oxide and a total of 2% by weight of iron oxide, sodium oxide and potassium oxide.

The throughput is 20 parts by volume per hour. 200,000 parts by volume of nitrogen per hour is used as an entrainer. The quartz tube is provided with a separator and a reflux condenser attached thereto. The gas leaving the reflux condenser is passed into a vessel two-thirds filled with water. 35 parts of imidazole crystallizes in the separator. Another 15 parts of imidazole is recovered by concentrating the wash water. The yield of imidazole in all is 73% of the theory with reference to ethylene diamine used. The reaction product has a pale yellow color. Impurities cannot be detected by infrared analysis. The product may be made completely colorless by recrystallization from benzene.

Example 2

The apparatus described in Example 1 is provided with a metering means capable of being heated and 200 parts of diformylethylene diamine is charged into the same. The molten product is passed over the catalyst in the course of ten hours under the conditions described in Example 1. 80 parts of imidazole separates in crystalline form and another 13 parts may be isolated by concentrating the wash water. This is a yield of 80% of the theory with reference to the diformylethylene diamine used.

Example 3

200 parts by volume of diformylethylene diamine is passed through a heatable metering means to which an evaporator is attached into a fluidized bed reactor which contains 250 parts by volume of the catalyst described in Example 1 (grain size 0.2 to 0.4 mm.). The evaporator is heated to 280° C. and the fluidized bed reactor to 480° C. At the same time, 300,000 parts by volume of nitrogen per hour is passed through the evaporator and the fluidized bed reactor. After the reaction temperature has been reached, 20 parts by volume of diformylethylene diamine per hour is passed from the metering means into the evaporator. The gas leaving the fluidized bed reactor then passes through a separator, a vessel two-thirds filled with water and a reflux cooler. 79 parts of imidazole separates in crystalline form in the separator; another 12 parts may be isolated from the wash water. This is a yield of 78% with reference to the diformylethylene diamine used.

If a catalyst containing 50% of aluminum oxide be used instead of the catalyst of Example 1, the yield is 70% of the theory with reference to the diformylethylene diamine used.

Example 4

The apparatus described in Example 3 is charged with a catalyst consisting of pure zinc oxide (particle size 0.2 to 0.5 mm.). The evaporator is heated to 280° C. and the fluidized bed reactor to 450° C. and 250,000 parts by volume per hour is passed through the evaporator and the fluidized bed reactor at the same time. When the reaction temperature has been reached, 200 parts by volume of diformylethylene diamine is supplied from the metering means into the evaporator during the course of ten hours. 78 parts of imidazole may be isolated in the way described in Example 3; this is equivalent to a yield of 65% of the theory.

By using zinc oxide containing 90% by weight of aluminum oxide, the yield is 42% of the theory.

A yield of 77% of the theory of imidazole is achieved with a catalyst consisting of 90% by weight of zinc oxide and 10% by weight of aluminum oxide.

We claim:

1. A process for the production of an imidazole of the formula

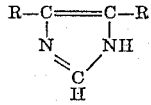

in which R denotes a member selected from the class consisting of hydrogen and alkyl of 1 to 4 carbon atoms, comprising reacting a compound having the formula

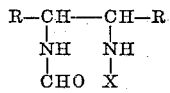

wherein R has the meanings given above and X denotes a member selected from the class consisting of hydrogen and the formyl group at a temperature between 250° and 800° C. in the gas phase in the presence of zinc oxide as a catalyst.

2. A process as claimed in claim 1 wherein a modified catalyst is used which in addition to zinc oxide contains a member selected from the group consisting of aluminum oxide, calcium oxide, potassium sulfate, magnesium oxide, phosphoric acid and mixtures thereof, the amount of zinc oxide exceeding 10% by weight with reference to said modified catalyst.

3. A process as claimed in claim 1 wherein the catalyst contains at least 34% by weight of zinc oxide, 5 to 50% by weight of aluminum oxide, 2 to 8% by weight of calcium oxide, and 2 to 8% by weight of potassium sulfate.

(References on following page)

References Cited

UNITED STATES PATENTS

| | | | |
|---|---|---|---|
| 2,214,152 | 9/1940 | Wilkes | 260—309.6 |
| 2,226,057 | 12/1940 | Graenacher et al. | 260—309 |
| 2,847,417 | 8/1958 | Erner | 260—309 |
| 3,037,028 | 5/1962 | Green | 260—309 |
| 3,255,200 | 6/1966 | Green | 260—309 |

FOREIGN PATENTS 837,838    6/1960    Great Britain.

OTHER REFERENCES

Farberov et al.: Chem. Abst. vol. 55, cols. 17630–1 (1961).

Moldavski et al.: Chem. Abst. vol. 32, col. 508 (1938).

Sabatier et al. Comptes Rendus Acad. Sci. (Paris), vol. 185, pp. 241–4 (1927).

JOHN D. RANDOLPH, *Primary Examiner.*

WALTER A. MODANCE, *Examiner.*

N. TROUSOF, *Assistant Examiner.*

UNITED STATES PATENT OFFICE
CERTIFICATE OF CORRECTION

Patent No. 3,388,132                            June 11, 1968

Hugo Kroeper et al.

It is certified that error appears in the above identified patent and that said Letters Patent are hereby corrected as shown below:

Column 1, lines 64 to 67, the right-hand portion of the formula should appear as shown below:

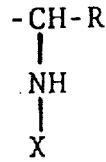

Column 2, line 14, "monoforylated" should read -- monoformylat --.

Signed and sealed this 16th day of December 1969.

(SEAL)
Attest:

Edward M. Fletcher, Jr.                          WILLIAM E. SCHUYLER

Attesting Officer                                      Commissioner of Paten